Feb. 17, 1959     D. N. HUMPHRIES     2,874,003
SAWHORSE
Filed May 13, 1954
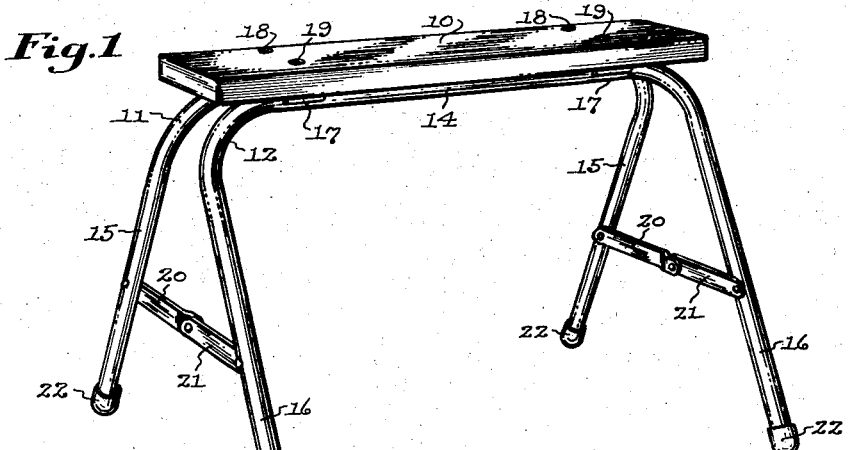
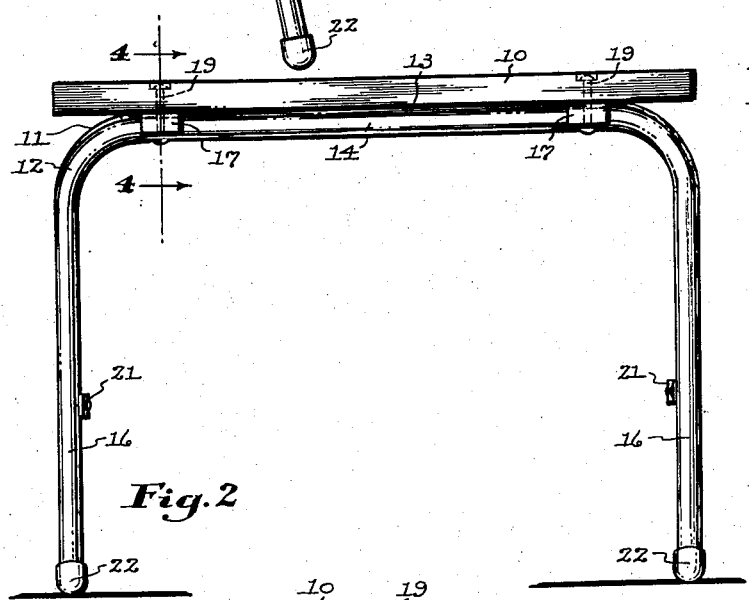
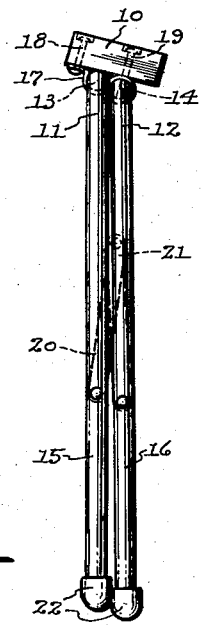
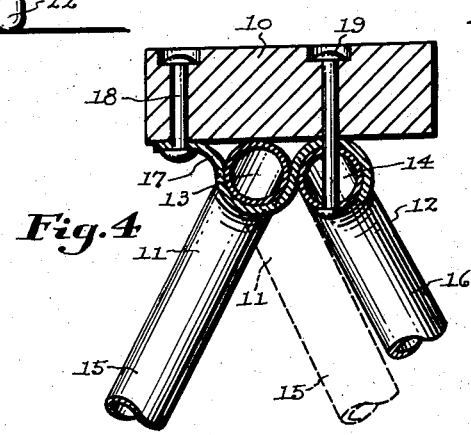
INVENTOR
Douglas N. Humphries
BY John S. Braddock
ATTORNEY United States Patent Office 2,874,003
Patented Feb. 17, 1959

2,874,003
SAWHORSE

Douglas N. Humphries, Grand Rapids, Mich.

Application May 13, 1954, Serial No. 429,617

3 Claims. (Cl. 304—5)

The present invention relates to a foldable sawhorse.

The primary objects of the invention are to provide a foldable sawhorse intended primarily for home use, which can be folded into a compact condition of non-use for storage in a minimum of space, or readily unfolded to an extended condition for use as a sawhorse or any other use for which it may be found adaptable; to provide such a foldable sawhorse which is simply but sturdily constructed of a minimum of parts; and in general to provide such a foldable sawhorse which is efficient in its intended use, reasonably economical in manufacture, and attractive in appearance.

An illustrative embodiment of the invention is shown in the accompanying drawing, wherein:

Figure 1 is a perspective view of my new sawhorse in its unfolded or extended condition ready for use;

Figure 2 is a side elevational view of the same;

Figure 3 is a side elevational view of the sawhorse in its folded non-use condition for storage; and Figure 4 is an enlarged fragmentary vertical sectional view of parts thereof taken on line 4—4 of Figure 2.

Referring now in detail to this drawing wherein like parts are designated by the same numerals in the several views, the new sawhorse there shown generally comprises a top bar 10 which is desirably made of wood, and a pair of inverted U-shaped tubular metal elements 11, 12 having bight portions 13, 14 respectively secured to the underside of the top bar 10, and leg portions 15, 15 and 16, 16 depending from said bight portions 13, 14 respectively and forming downwardly-outwardly extending legs for the sawhorse when in its extended condition for use as shown in Figure 1.

The bight portions 13, 14 of the U-shaped tubular elements 11, 12 are secured to the underside of the top bar 10 by means of a pair of spaced hangers 17 located slightly inside the bent corners of the tubular elements. Each hanger 17 comprises a metal strap having one end secured to the top bar near one of the latter's lower edges by means of a rivet 18, the strap then extending downwardly and then upwardly toward the opposite lower edge of the top bar thus forming spaced bearings in which are swingably disposed the opposite ends of the bight portion 13 of the U-shaped element 11. Each strap then extends between the top bar 10 and the bight portion 14 of the U-shaped element 12, and thence is curled downwardly to embrace said bight portion 14. The other end of each hangar strap is secured to the top bar 10 by means of a rivet 19 which extends through the top bar 10, through the portion of strap 17 extending between the top bar 10 and the bight portion 14 of the U-shaped element 12, and through said bight portion 14 thus rigidly securing the U-shaped element 12 to the underside of the top bar.

It will be seen that the supporting U-shaped elements are thus mounted on the underside of the top bar for interrelative swinging movement, the U-shaped element 12 being fixedly secured to the top bar and the U-shaped element 11 being hingedly connected to the top bar.

Means are provided for limiting the unfolding movement of the sawhorse to its extended use condition, which means comprise a pair of links 20, 21 at each end of the sawhorse, the links 20, 21 of each pair being connected to each other and to one of the legs 15, 16 respectively at that end of the sawhorse. These links fold upwardly during folding movement of the sawhorse to its condition of non-use or storage shown in Figure 3. In Figure 4 the parts of the sawhorse are indicated in their unfolded positions in full lines, and the hinged U-shaped element 11 is also indicated in its folded position alongside the fixed U-shaped element 12, in dotted lines.

I preferably provide the lower extremities of the legs of the sawhorse with rubber tips or feet 22 as shown, for protecting a floor on which the sawhorse may be erected and also for preventing any slippage of the sawhorse when in use.

It will thus be seen that the invention provides an attractive and practical foldable sawhorse for home use, and while but one specific embodiment of the invention has been herein shown and described, it will be understood that numerous details thereof may be altered or omitted without departing from the spirit of the invention as defined by the following claims.

I claim:

1. A foldable sawhorse comprsing a top bar, and a pair of inverted U-shaped elements having their bight portions secured to the underside of the top bar and having their leg portions depending from said bight portions at opposite sides of the top bar to form opposite pairs of downwardly-outwardly extending supporting legs for the sawhorse when in its extended condition of use, one of said U-shaped elements being hingedly connected to said top bar so as to be swingable to a position alongside the other U-shaped element with the feet of the elements together in the folded, non-use condition of the sawhorse, the bight portions of said U-shaped elements secured to the underside of the top bar by means of spaced hangers each comprising a strap having one end thereof secured to the top bar near one edge of the bar and extending downwardly and then upwardly toward the opposite edge of the top bar to provide a bearing for the hingedly connected U-shaped element, and thence between the top bar and the bight portion of the other U-shaped element, and fastening means passing through said other U-shaped element, through the strap, and through the top bar.

2. A foldable sawhorse according to claim 1 in which the inverted U-shaped elements are fabricated of metal tubing.

3. A foldable sawhorse according to claim 1 in which the top bar is of only slightly greater width than the combined widths of the bight portions of said U-shaped elements.

References Cited in the file of this patent

UNITED STATES PATENTS

| 884,280 | Liden | Apr. 7, 1908 |
| 1,518,886 | White | Dec. 9, 1924 |
| 1,696,193 | Deland | Dec. 25, 1928 |
| 2,412,395 | Goosmann | Dec. 10, 1946 |
| 2,427,679 | Larson | Sept. 23, 1947 |
| 2,556,261 | Dubach | June 12, 1951 |
| 2,669,480 | Messick et al. | Feb. 16, 1954 |
| 2,684,276 | Bailey | July 20, 1954 |

FOREIGN PATENTS

| 209,946 | Switzerland | Aug. 16, 1940 |
| 694,913 | Great Britain | July 29, 1953 |